United States Patent
Collins et al.

(10) Patent No.: US 11,215,096 B2
(45) Date of Patent: Jan. 4, 2022

(54) SYSTEMS AND METHODS FOR UNIFORMLY HEATING A HONEYCOMB BODY

(71) Applicant: CORNING INCORPORATED, Corning, NY (US)

(72) Inventors: Thomas Adam Collins, Horseheads, NY (US); Tushar Gulati, Painted Post, NY (US); David Robert Heine, Hammondsport, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/998,615

(22) Filed: Aug. 20, 2020

(65) Prior Publication Data
US 2021/0054771 A1 Feb. 25, 2021

Related U.S. Application Data

(60) Provisional application No. 62/889,800, filed on Aug. 21, 2019.

(51) Int. Cl.
*F01N 3/20* (2006.01)
*H05B 3/18* (2006.01)
(Continued)

(52) U.S. Cl.
CPC ........... *F01N 3/2013* (2013.01); *B01D 53/94* (2013.01); *F01N 3/2803* (2013.01);
(Continued)

(58) Field of Classification Search
CPC ..... F01N 3/2013; F01N 2330/06; H05B 3/18; H05B 3/0019; H05B 2203/024
(Continued)

(56) References Cited

U.S. PATENT DOCUMENTS

| 3,982,100 A | 9/1976 | George et al. |
| 4,979,364 A | 12/1990 | Fleck |

(Continued)

FOREIGN PATENT DOCUMENTS

| CN | 107690514 A | 2/2018 |
| EP | 1441112 A1 | 7/2004 |

(Continued)

OTHER PUBLICATIONS

Wikipedia, "Entrance length (fluid dynamics)", available online at <https://en.wikipedia.org/w/index.php?title=Entrance_length_(fluid_dynamics)&oldid=910013597>, Aug. 9, 2019, 9 pages.

*Primary Examiner* — Tom P Duong
(74) *Attorney, Agent, or Firm* — Kurt R. Denniston

(57) ABSTRACT

An electrical heater and method for heating a catalyst. The heater includes a honeycomb body having intersecting walls forming channels extending along a longitudinal axis. A plurality of electrically resistive paths are included, each including at least a portion of the plurality of intersecting walls and extending a length across the honeycomb body transverse to the longitudinal axis. A positive electrode and a negative electrode are in electrical communication with each other via the resistive paths. The positive electrode and the negative electrode are operatively positioned to generate a respective flow of current through each resistive path. The lengths of at least two of the resistive paths differ from each other. The resistive paths are configured with respect to the at least one positive electrode and the at least one negative electrode such that the current in each of the resistive paths is substantially equal.

20 Claims, 10 Drawing Sheets

(51) Int. Cl.
*H05B 3/03* (2006.01)
*H05B 3/00* (2006.01)
*B01D 53/94* (2006.01)
*F01N 3/28* (2006.01)

(52) U.S. Cl.
CPC ............ *H05B 3/0019* (2013.01); *H05B 3/03* (2013.01); *H05B 3/18* (2013.01); *F01N 2330/02* (2013.01); *F01N 2330/06* (2013.01); *H05B 2203/005* (2013.01); *H05B 2203/024* (2013.01)

(58) Field of Classification Search
USPC ........................................................ 422/174
See application file for complete search history.

(56) References Cited

U.S. PATENT DOCUMENTS

| | | | |
|---|---|---|---|
| 5,063,029 A * | 11/1991 | Mizuno | F01N 3/2803 422/175 |
| 5,146,743 A | 9/1992 | Maus et al. | |
| 5,202,547 A * | 4/1993 | Abe | F01N 3/2803 219/552 |
| 5,259,190 A | 11/1993 | Bagley et al. | |
| 5,288,975 A | 2/1994 | Kondo | |
| 5,393,586 A * | 2/1995 | Lipp | F01N 3/2026 428/116 |
| 5,433,926 A * | 7/1995 | Swars | F01N 13/017 422/174 |
| 5,446,264 A * | 8/1995 | Kondo | H05B 3/12 219/552 |
| 5,449,541 A * | 9/1995 | Lipp | B01D 29/846 428/116 |
| 5,463,206 A | 10/1995 | Abe et al. | |
| 5,533,167 A * | 7/1996 | Kondo | F01N 13/009 392/485 |
| 5,554,342 A * | 9/1996 | Hirayama | B01J 35/0033 422/174 |
| 5,569,455 A | 10/1996 | Fukui et al. | |
| 5,582,803 A | 12/1996 | Yoshizaki et al. | |
| 5,582,805 A * | 12/1996 | Yoshizaki | F01N 3/2026 422/174 |
| 5,588,292 A | 12/1996 | Hiraishi et al. | |
| 5,597,503 A | 1/1997 | Anderson et al. | |
| 5,641,332 A | 6/1997 | Faber et al. | |
| 5,651,088 A | 7/1997 | Abe et al. | |
| 5,680,503 A * | 10/1997 | Abe | F01N 3/2803 392/485 |
| 5,800,787 A | 9/1998 | Kato et al. | |
| 5,861,611 A * | 1/1999 | Kato | F01N 3/2817 219/552 |
| 6,112,520 A | 9/2000 | Kaiho et al. | |
| 6,235,254 B1 * | 5/2001 | Murphy | F01N 13/009 423/212 |
| 7,575,793 B2 | 8/2009 | Aniolek et al. | |
| 8,329,110 B2 | 12/2012 | Kinoshita et al. | |
| 8,530,803 B2 | 9/2013 | Sakashita et al. | |
| 8,597,585 B2 | 12/2013 | Sakashita et al. | |
| 8,604,811 B2 | 12/2013 | Kawase et al. | |
| 8,604,881 B2 | 12/2013 | Sankalp et al. | |
| 8,679,413 B2 | 3/2014 | Ishihara | |
| 8,715,579 B2 | 5/2014 | Ido et al. | |
| 8,761,586 B2 | 6/2014 | Bruck | |
| 8,765,068 B2 | 7/2014 | Ishihara | |
| 8,986,619 B2 | 3/2015 | Yasuo et al. | |
| 9,243,540 B2 | 1/2016 | Hashimoto | |
| 9,421,495 B2 | 8/2016 | Kakinohana et al. | |
| 9,488,085 B2 | 11/2016 | Crawford et al. | |
| 9,516,702 B2 | 12/2016 | Nagareda et al. | |
| 9,657,622 B2 | 5/2017 | Douglas et al. | |
| 9,707,515 B2 | 7/2017 | Kasai et al. | |
| 9,845,714 B2 | 12/2017 | Mori et al. | |
| 9,993,813 B2 | 6/2018 | Omiya et al. | |
| 2013/0312393 A1 | 11/2013 | Yoshioka | |
| 2015/0267583 A1 | 9/2015 | Brueck et al. | |
| 2016/0346776 A1 | 12/2016 | Omiya et al. | |
| 2018/0238210 A1 | 8/2018 | Takase et al. | |
| 2018/0264456 A1 | 9/2018 | Takase | |
| 2019/0383193 A1 | 12/2019 | Pabst et al. | |

FOREIGN PATENT DOCUMENTS

| | | |
|---|---|---|
| JP | 2011-247162 A | 12/2011 |
| JP | 2012-092821 A | 5/2012 |
| JP | 5261256 B2 | 8/2013 |
| JP | 2014-062467 A | 4/2014 |
| JP | 5533753 B2 | 6/2014 |
| WO | 2016/163423 A1 | 10/2016 |

* cited by examiner

SYSTEMS AND METHODS FOR UNIFORMLY HEATING A HONEYCOMB BODY

CROSS REFERENCE TO RELATED APPLICATION

This application claims the benefit of priority under 35 U.S.C § 120 of U.S. Provisional Application Ser. No. 62/889,800 filed on Aug. 21, 2019, the content of which is relied upon and incorporated herein by reference in its entirety

BACKGROUND

This application generally relates to electrical heaters for heating a catalyst, and specifically, electrical heaters generating a substantially uniform current across a cross-section of a honeycomb body.

SUMMARY

All examples and features mentioned below can be combined in any technically possible way.

In one aspect, an electrical heater is provided. The electrical heater comprises a honeycomb body comprising a plurality of intersecting walls that form a plurality of channels extending along a longitudinal axis, the intersecting walls comprising a conductive material; a plurality of electrically resistive paths, each resistive path of the plurality of resistive paths comprising at least a portion of the plurality of intersecting walls and extending a length across the honeycomb body transverse to the longitudinal axis; and at least one positive electrode and at least one negative electrode in electrical communication with each other via the plurality of resistive paths, the at least one positive electrode and the at least one negative electrode being operatively positioned to generate a respective flow of current through each resistive path; wherein the lengths of at least two of the resistive paths differ from each other; and wherein the resistive paths are configured with respect to the at least one positive electrode and the at least one negative electrode such that the current in each of the resistive paths is substantially equal.

In some embodiments, the positive electrode and negative electrode are arranged such that the plurality of resistive paths are mutually electrically parallel, the total resistance of each path being substantially equal.

In some embodiments, the a width of each resistive path of the plurality of resistive paths is proportional to its length, such that a resistance of each resistive path of the plurality of resistive paths is substantially equal.

In some embodiments, the one or more of the insulating layers do not extend entirely across the honeycomb body. In some embodiments, the heater further comprises a plurality of conductors associated with the plurality of resistive paths, wherein at least one of the conductors is embedded in the honeycomb structure to promote current flow between each of the resistive paths and the positive electrode, the negative electrode, or both.

In some embodiments, the honeycomb body comprises an outer skin against which the positive and negative electrodes are engaged, wherein the outer skin is conductive in contact with the conductors. In some embodiments, the conductors comprise one or more of the channels of the honeycomb body filled with conductive material.

In some embodiments, the positive electrode and the negative electrode apply a respective voltage to each resistive path of the plurality of resistive paths, wherein a magnitude of the respective voltage is proportional to a total resistance of the resistive path to which the respective voltage is applied. In some embodiments, the positive electrode comprises a plurality of positive electrodes, each positive electrode of the plurality of positive electrodes being associated with at least one resistive path of the plurality of resistive paths and being configured to apply the respective voltage to the associated resistive path.

In some embodiments, the each insulating layer is formed by a slot in the honeycomb body. In some embodiments, the plurality of insulating layers are mutually parallel, each insulating layer extending in a respective plane parallel to central axis of the electrical heater.

In another aspect, a system for treating exhaust is provided comprising an electrical heater according to any of the foregoing.

In some embodiments, the system further comprises an exhaust treatment device, wherein the honeycomb body of the electrical heater is a first honeycomb body and the exhaust treatment device comprises a second honeycomb body, and wherein the electrical heater is positioned upstream of the exhaust treatment device.

In some embodiments, the exhaust treatment device comprises a filter, a substrate loaded with catalytic material, or a partial filter. In some embodiments, the first honeycomb body of the electrical heater has a wall thickness that is different than that of the second honeycomb body of the exhaust treatment device. In some embodiments, the first honeycomb body of the electric heater has a cells per square inch that is different than that of the second honeycomb body of the exhaust treatment device.

In some embodiments, the intersecting walls are loaded with a catalytic material. In some embodiments, the honeycomb body of the heater is cylindrical.

In some embodiments, the honeycomb body comprises a plurality of separate blocks or segments of honeycomb structure, wherein each of the resistive paths is formed by one of the separate blocks or segments of honeycomb structure. In some embodiments, the separate blocks or segments of honeycomb structure are separated from each other by the plurality of insulating layers.

In another aspect, a method for heating a catalyst with a heater that comprises a honeycomb body comprising a plurality of intersecting walls and a longitudinal axis is provided. The method comprises applying a potential difference across an electrode pair comprising a positive electrode and a negative electrode to generate a respective flow of current through each resistive path of a plurality of resistive paths formed between the electrode pair across a cross-section of the honeycomb body of the heater; wherein the resistive paths of the plurality of resistive paths are separated from each other by one or more insulating layers; wherein lengths of at least two of the resistive paths of the plurality of resistive paths are different; and wherein the resistive paths are configured with respect to the electrode pair such that the current in each of the resistive paths is substantially similar.

In some embodiments, the positive electrode and negative electrode are arranged such that the plurality of resistive paths are mutually electrically parallel, the total resistance of each path being substantially similar.

In some embodiments, a width of each resistive path of the plurality of resistive paths is proportional to its length, such that a resistance of each resistive path of the plurality of resistive paths is substantially similar.

In some embodiments, the honeycomb body further comprises an outer skin disposed about at least a portion of the honeycomb body, wherein at least a portion of the outer skin carries an electric charge received from the positive electrode, wherein the honeycomb body defines a first plurality of slots, each slot of the first plurality of slots being in electrical communication with a respective resistive path of the plurality of resistive paths and being in further electrical communication with the at least a portion of the outer skin, such that the electric charge is communicated to the respective resistive path of the plurality of resistive paths.

In some embodiments, the step of applying a potential difference comprises applying a respective potential difference to each resistive path of the plurality of resistive paths, wherein a magnitude of the respective potential difference is proportional to a total resistance of the resistive path to which the respective potential difference is applied.

In some embodiments, the positive electrode comprises a plurality of positive electrodes, each positive electrode of the plurality of positive electrodes being associated with at least one resistive path of the plurality of resistive paths and being configured to apply the respective potential difference to the associated resistive path.

The details of one or more implementations are set forth in the accompanying drawings and the description below. Other features, objects, and advantages will be apparent from the description and the drawings, and from the claims.

DETAILED DESCRIPTION

Some catalytic converters rely on the heat of engine exhaust to activate the catalyst in order begin treatment of vehicle emissions. However, a significant proportion, or even a majority, of total emissions in some vehicles may occur immediately after starting the vehicle, while the catalyst is still cold. Embodiments disclosed herein pertain to active heating systems and methods that do not merely rely solely on the existing heat of the engine exhaust, thereby enabling vehicle emissions to be further reduced, particularly after cold-start of the vehicle.

One such method for actively heating the exhaust is via an electrically heated catalyst (EHC) system, which raises the catalyst temperature by supplying electric power from the battery of the vehicle to the catalytic converter. Electrically heated catalyst designs, however, be affected by issues such as varying degrees of non-uniform heating profiles, which degrade performance and decreases the efficiency in electrical energy usage.

Figure 1:
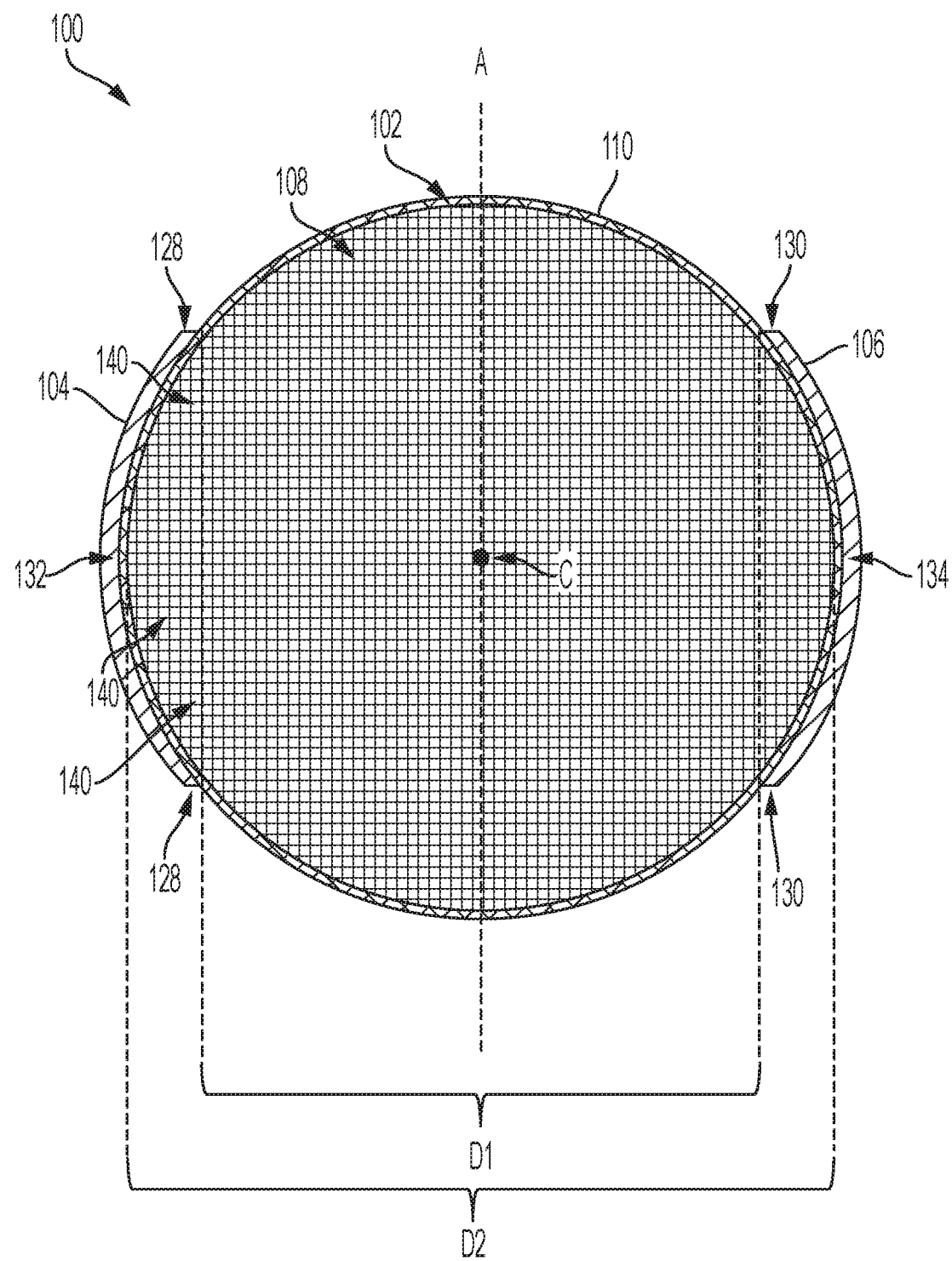
FIG. 1 depicts a cross-section of a heater for heating a catalyst, according to an embodiment, according to an example.

There is shown in FIG. 1 a cross-sectional view of an electrical heater 100 for heating a catalyst, comprising a honeycomb body 102, a positive electrode 104, and a negative electrode 106, which are operatively positioned to generate current through the honeycomb body 102. The honeycomb body 102 can be substantially cylindrical, the view of FIG. 1 thus depicting a cross-section taken transverse to a central axis C extending longitudinally through honeycomb body 102, or other shape such as a rectangular prism. In some embodiments, the honeycomb body 102 is substantially disk-shaped (i.e., a cylinder having an axial length that is substantially less than its diameter). The electrodes 104 and 106 can be positioned symmetrically on opposite sides of the honeycomb body 102 with respect to a diametrical axis A. The honeycomb body 102 can comprise a honeycomb structure 108 and a skin 110. The positive electrode 104 and negative electrode 106 can be respectively positioned to generate a flow of current transverse to the central axis C of the honeycomb body 102, through the honeycomb structure 108, in order to generate heat within the honeycomb body 102 due to an electrical resistance of the material forming the walls of the honeycomb body 102. In this way, the intersecting walls of the honeycomb structure 108 (e.g., each separate wall, or combinations of multiple walls or portions of multiple walls) form a plurality of current paths for the conduction of electricity between the positive electrode 104 and the negative electrode 106. The positive electrode 104 and the negative electrode 106 can thus be positioned to create a potential difference across the cross-section of honeycomb body 102. Due to the resistivity of the material forming the honeycomb structure 108 that enables the herein described resistance heating, each of the current paths extending between the electrodes 104, 106 may be referred to herein as a resistance path.

Figure 2:
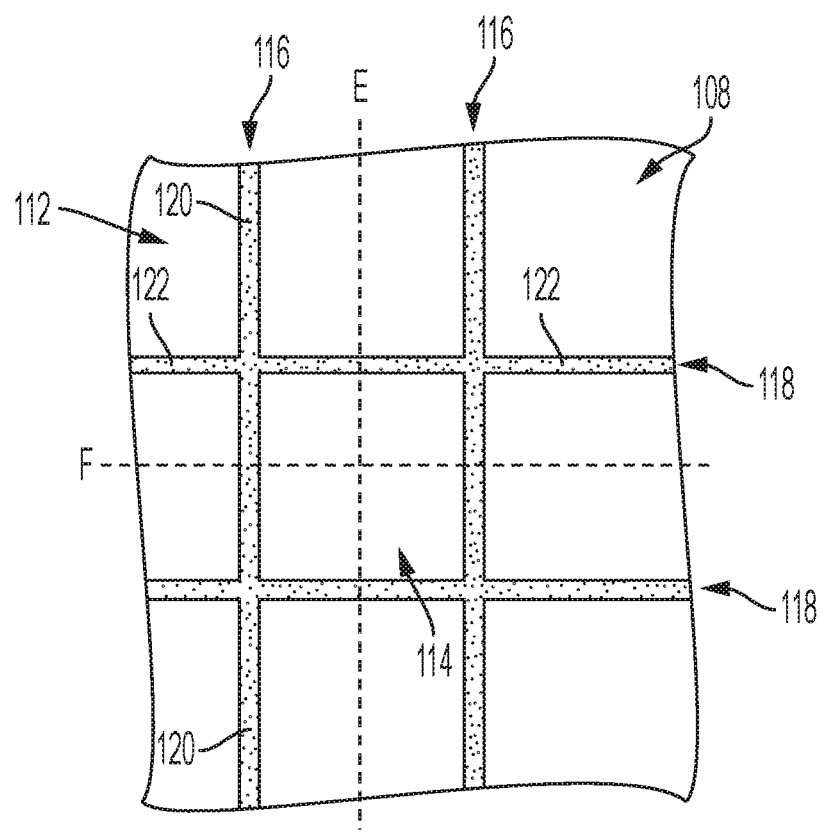
FIG. 2 depicts a front view of a partial honeycomb structure, according to an example.
Figure 4:
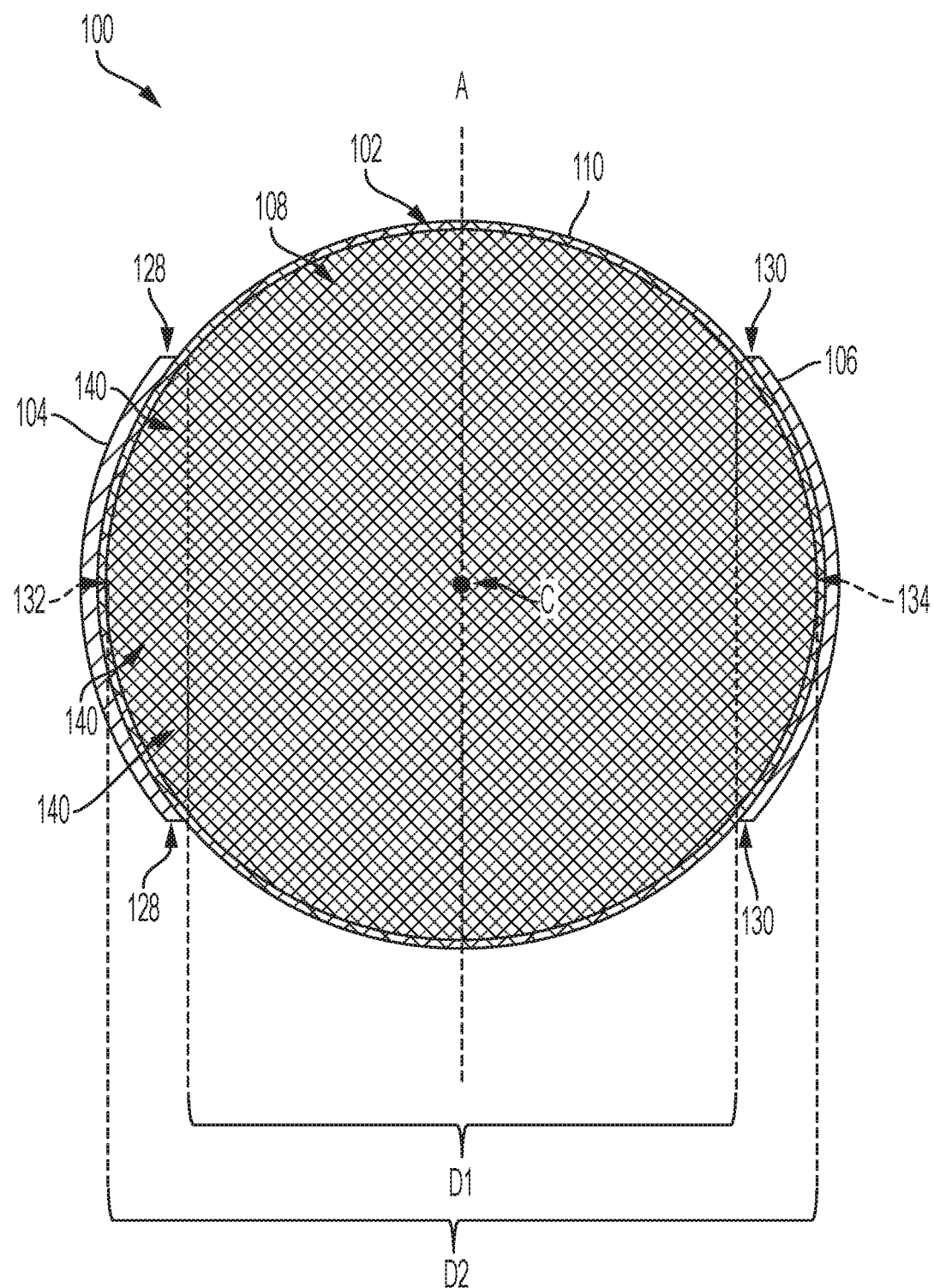
FIG. 4 depicts a cross-section of a heater for heating a catalyst, according to an embodiment, according to an example.

As shown in FIG. 2, honeycomb structure 108 comprises a plurality of intersecting walls 112, forming a plurality of contiguous cells 114. The intersecting walls 112 can, for example, comprise a first set of walls 116 extending parallel to a first direction E and a second set of walls 118 extending parallel to a second direction F, the first direction E and second direction F both extending across a cross-section of the honeycomb structure 108 and being mutually orthogonal. Each wall 116, 118 can comprise a plurality of webs 120, 122, which define cells or channels that extend longitudinally through the honeycomb body 102. For example, the first set of walls 116 can comprise webs 120, extending parallel to first direction E, while the second set of walls 118 can comprise webs 122 extending parallel to second direction F. The geometry of cells 144 and the corresponding structure of the intersecting walls 112 of FIG. 2 are presented merely as an example, and, in alternative example, the cells 114 can be any suitable shape, including, for example, rectangular, triangular, hexagonal, or polygonal, arranged in a repeating pattern. The cells 144 can be any suitable shape for functioning as a catalytic converter and for carrying current, along the connected plurality of webs 120, 122, between the positive electrode 104 and the negative electrode 106. First direction E and second direction F need not extend parallel and perpendicular with respect to diametrical axis A as shown in FIGS. 1-2, but rather can extend at, for example, an angle, such as a 45° angle with respect to diametrical axis A as shown in FIG. 4.

The honeycomb structure 108 can be formed, for example, by extrusion of a ceramic forming material through an extrusion die to form a green body, which is then cut, dried, and fired into a final ceramic honeycomb body. The ceramic forming material can comprise inorganics (e.g., alumina, silica), binders (e.g., methylcellulose), pore formers (e.g., starch, graphite, resins), a liquid vehicle (e.g., water), sintering aids, or any other additives helpful in the manufacture of the final ceramic honeycomb body. The final ceramic honeycomb body can comprise cordierite, aluminum titanate, alumina, mullite, silicon carbide, and/or other ceramic materials, or combinations thereof. If a ceramic material is utilized with a conductivity unsuitable to provide effective resistive heating, the ceramic material can be doped or combined with a more conductive material, such as metal, to increase the conductivity of the honeycomb body. In an alternative example, the honeycomb structure can be formed entirely of a metal, rather than ceramic, or as other combinations or compounds of different materials having various resistivities.

Figure 3:
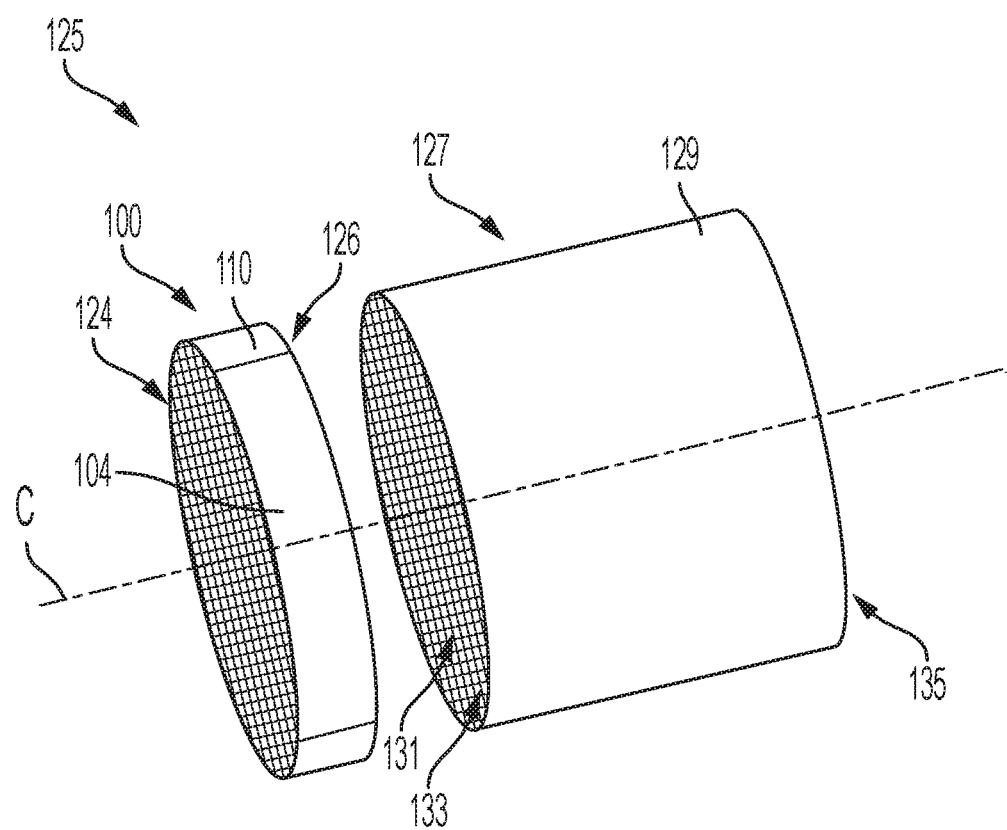
FIG. 3 depicts a perspective view of an electrical heater, according to an example.

FIG. 3 shows a perspective view of heater 100. At least a subset of the cells 114 can extend axially between opposing end faces 124, 126 of the honeycomb body 102 to define a set of channels through which a gas can flow (e.g., the exhaust stream from a vehicle engine). The inlet face 124, can thus be in fluid communication with the outlet face 126 via the channels, so that a gas, incident upon inlet end face 124 can flow through the channels formed by the cells 114 and exhaust end face 126. Positive electrode 104 and negative electrode 106 (not shown in this view) can extend the full axial length of the honeycomb body 102, or along only portion of the honeycomb body 102 (e.g., from the inlet end to a midway point along the axial length of the honeycomb body 102 for preheating the stream of gas flowing through the honeycomb body 102).

As shown in FIG. 3, a system 125 can comprise the heater 100 disposed upstream of an exhaust treatment device 127, e.g., a catalytic substrate, filter, or partial filter. Like heater 100, exhaust treatment device 127 can comprise a honeycomb body comprising an outer skin 129 and a honeycomb structure 131. The honeycomb structure 131 can be impregnated or coated with a catalyst that, when heated by the exhaust (which is also heated by heater 100), activates to react with components of the exhaust. The honeycomb structure 131 of the exhaust treatment device 127 can comprise a plurality of intersecting walls comprised of webs, forming a plurality of contiguous cells. The cells of the exhaust treatment device 127, in cross-section, can be formed of any suitable shape, including, for example, square, rectangular, triangular, or hexagonal. The cells of the exhaust treatment device 127 need not be the same shape or dimension as the cells 114 of the heater 100. Indeed, the cells of the exhaust treatment device 127 may be larger or smaller than the cells 114 of the heater 100, and/or may be a different shape in cross-section.

The cells of the exhaust treatment device 127 extend axially between opposing end faces 133, 135 of the exhaust treatment device 127 to define a set of channels through which a gas can flow. If the exhaust treatment device 127 is arranged as a filter, at least some of the channels can be plugged, e.g., alternatingly opposite end faces 133, 135. The inlet face 133, can thus be in fluid communication with the outlet face 135 via the channels, so that a gas, incident upon inlet end face 133 can flow to the end face 135 directly through unplugged channels formed by the cells, or flow through the porous walls between adjacent channels of a plugged filter.

The exhaust treatment device 127 can be formed, for example, by extrusion of a ceramic forming material through an extrusion die as a green body, which is then cut, dried, and fired into a final ceramic honeycomb body (comprising outer skin 129 and honeycomb structure 131). The ceramic forming material can comprise inorganics (e.g., alumina, silica, etc.), binders (e.g., methylcellulose), pore formers (e.g., starch, graphite, resins), a liquid vehicle (e.g., water), sintering aids, or any other additives helpful in the manufacture of the final ceramic honeycomb body. The final ceramic honeycomb body 102 can comprise cordierite, aluminum titanate, alumina, mullite, silicon carbide, and/or other ceramic materials, or combinations thereof. The properties of the honeycomb body of the exhaust treatment device 127 can be the same as or different than those of the honeycomb body of the heater 100. For example, the honeycomb body of the exhaust treatment device can be made from a material, have a wall thickness, have a cells per square inch (cpsi), have a shape, or a combination thereof, that is different than the corresponding property or properties of the honeycomb body of the heater 100.

The current generated in heater 100 serves to heat the exhaust which flows therethrough. Thus, the heater 100 heats a catalyst disposed on the walls of the heater 100 and/or on the walls of the exhaust treatment device 127 by heating the exhaust that flows through the system 125. In some embodiments, the heater 100 is axially shorter than exhaust treatment device 127, so that heater 100 will heat relatively quickly, e.g., due at least in part to the relatively smaller thermal mass of the heater 100. For example, exhaust treatment device 127 can have an axial length of about 6 in., while heater 100 has an axial length of about 0.25 in. Furthermore, particularly when different material compositions, web thicknesses, channel sizes, and/or channel dimensions are utilized between the heater 100 and the exhaust treatment device 127, the heater 100 and the exhaust treatment device 127 can be extruded as separate bodies. In some embodiments, the heater 100 can be arranged as a catalytic substrate (i.e., having the walls of the heater 100 loaded with catalytic material) and/or filter (i.e., having channels plugged alternatingly at opposite end faces) without the inclusion of exhaust treatment device 127.

As mentioned above, the honeycomb body 102 can further comprise outer skin 110 disposed about the outer periphery of the honeycomb structure 108. The outer skin 110 can thus define an outer surface of the honeycomb body 102. Positive electrode 104 and the negative electrode 106 can be placed in contact with the skin 110 of the honeycomb body 102, as shown, for example, in FIG. 3, where the at least one positive electrode 104 and at least one negative electrode 106 extend circumferentially about a least a portion of skin 110. In one example, the electrodes 104, 106 can together cover a major portion of the circumferential length of the outer skin 110. In alternative examples, the electrodes 104, 106 can be embedded within the skin 110 or within honeycomb structure 108, as shown, for example in FIGS. 5A-5C and as will be discussed in detail below.

Returning to FIG. 1, due to the cylindrical shape of the heater 100, the ends 128, 130 of electrodes 104, 106 will be nearer together than the center 132, 134 of electrodes 104, 106. As a result, a distance D1 across the cross-section of the honeycomb body 102 between the first end 128 of the positive electrode 104 and first end 130 of the negative electrode 106 will be shorter than a distance D2 between the center 132 of positive electrode 104 and the center 134 of negative electrode 106. In this way, the intersecting walls 112 (e.g., each wall separately, or a combination of multiple walls, or portions of multiple walls) form resistive paths between the positive electrode 104 and the negative electrode 106 that have differing lengths (i.e., distances between the opposing electrodes defined along the current-carrying walls 112 of the honeycomb body 102). For example, the length of resistive paths formed proximate to and between ends 128, 130 have a length of approximately D1, while the length of resistive paths formed proximate to and between centers 132, 134 have a length of approximately D2. Because the resistance of a given path between the electrodes 104, 106 is determined at least in part by the length of the path, the intersecting walls 112 extending only distance D1 between electrodes 104, 106 will receive more current than the intersecting walls 112 extending distance D2 between electrodes 104, 106. For example, the current path through intersecting walls 112 extending between the first end 128 of the positive electrode and the first end 130 of the negative electrode 106 will be shorter and thereby exhibit a lower total resistance than the current path through intersecting walls 112 extending between the center 132 of the positive electrode 104 and the center 134 of the negative electrode 106. Thus, as shown in FIG. 1 the lengths, and, accordingly, resistances, of current paths through the intersecting walls 112 extending between the positive electrode 104 and the negative electrode 106 varies along diametrical axis A extending across the cross-section of the honeycomb body 102.

The variation in resistances of the current paths between the electrodes on opposite sides of the heater 100 promotes creation of an uneven heating profile across a cross-section of honeycomb body 102. For example, the honeycomb body 102 will become hotter towards either end of the electrodes, where the current path between electrodes is shortest, and thus, resistance is lower. In a first example, to achieve substantially uniform current across the cross section between the positive electrode 104 and the negative electrode 106, the honeycomb structure 108 can be divided into a plurality of resistive paths 140 by a plurality of insulating layers 142. Each resistive path 140 comprises a plurality of cells 114 that extends across the cross-section of the honeycomb structure 108 and are electrically isolated from adjacent resistive paths 140 by the insulating layers 142. For example, each of the resistive paths 140 can be made from separate blocks, or segments, of honeycomb structure, e.g., cut out of a larger honeycomb body. Each resistive path 140 can extend across the cross-section of the honeycomb body 102 in a direction transverse to the diametrical axis A about which positive electrode 104 and negative electrode 106 are disposed. To define resistive paths 140 that extend transverse to diametrical axis A, insulating layers 142 can be arranged to be mutually substantially parallel, each extending in a respective plane parallel to the axial direction of the honeycomb structure. However, it should be understood that, in alternative examples, the insulating layers 142 need not be straight, but rather can be formed of bent or curved insulating layer 142. The insulating layers 142 can be formed in any suitable way for mutually insulating adjacent resistive paths 140, including by forming slots in honeycomb structure. The slots can be filled with a non-conductive, insulating material such as silicon carbide or cordierite, although other suitable insulating materials can be used, or the slots can remain unfilled.

Positive electrode 104 and negative electrode 106 are positioned to generate a respective flow of current through each resistive path 140. In other words, the positive electrode 104 and negative electrode 106 can be positioned with respect to each resistive path 140 so as to cause a flow of current in each respective resistive path 140 that does not subsequently flow through any other resistive path 140. Thus, the current flowing in each resistive path 140 can flow only through that respective resistive path 140.

In various examples, as will be described below, current in each resistive path 140 can be substantially equivalent to the current in each other resistive path 140 (a substantially equivalent current in each resistive path 140 will result in substantially uniform current across the cross-section between the electrodes 104, 106). In a first method, the resistive paths 140 exhibit disparate resistances (e.g., proportional to the length and width of the given resistive path 140), with correspondingly disparate potential differences proportional to the total resistance of each resistive path 140 applied to each resistive path, such that the current through each resistive path 140 is substantially equivalent. In a second method, the resistive paths are electrically parallel (that is, be subject to the same potential difference), but the geometry of the resistive paths is varied such that the total resistance of each resistive path is substantially similar, and the resulting current through each resistive path 140 is substantially equivalent. For example, in a honeycomb body having consistent wall thickness, the widths of each resistive path (e.g., number of rows of cells of the honeycomb structure in each resistive path) can be varied such that relatively longer resistive paths (e.g., between the centers 132 and 134 of the electrodes 104 and 106) are wider (e.g., include a greater number of rows of cells) than the shorter resistive paths (e.g., between the ends 128 and 130 of the electrodes 104 and 106).

Figure 5A:
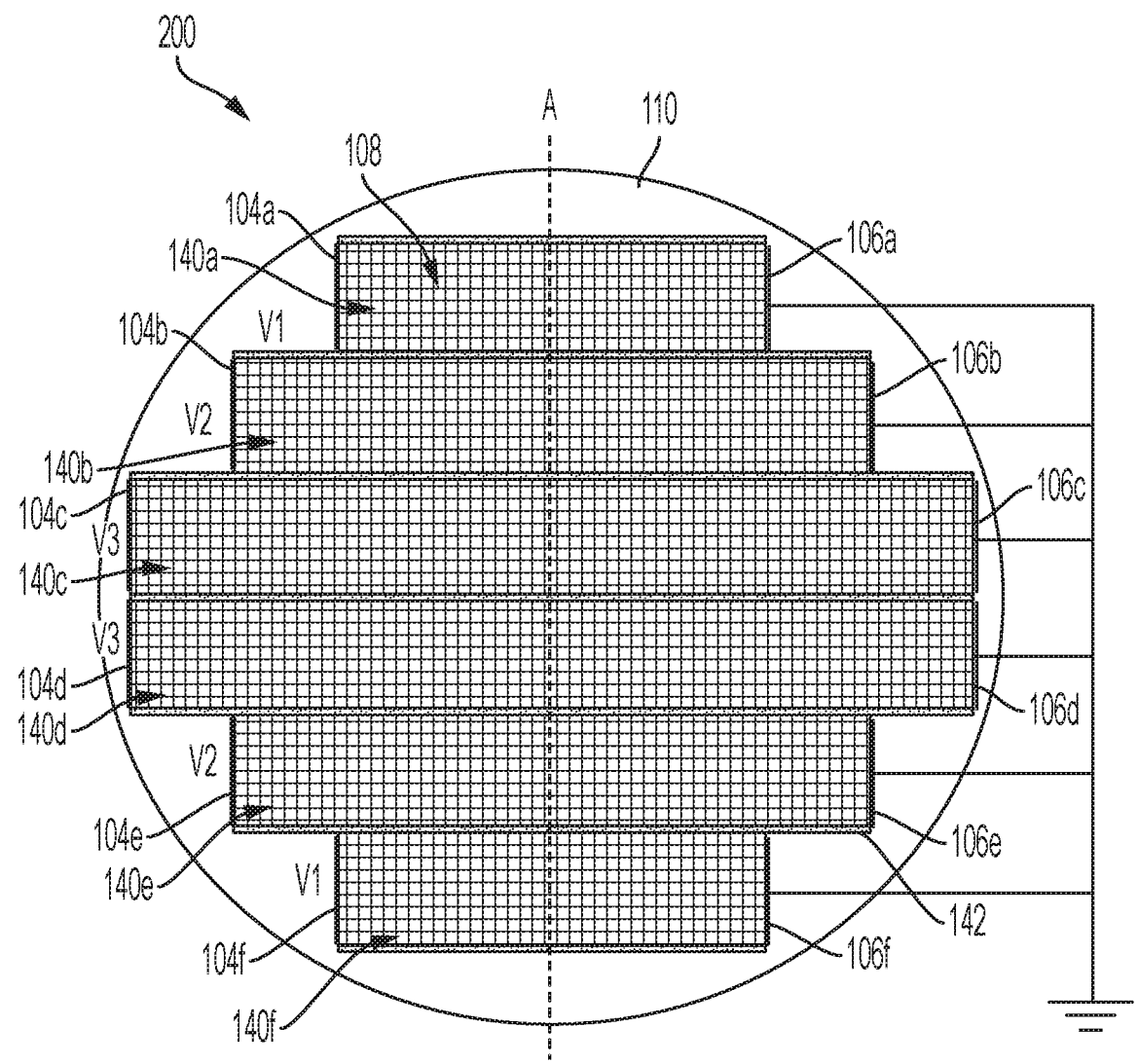
FIG. 5A depicts a cross-section of a heater for heating a catalyst with multiple resistive paths of different lengths, according to an example.
Figure 5B:
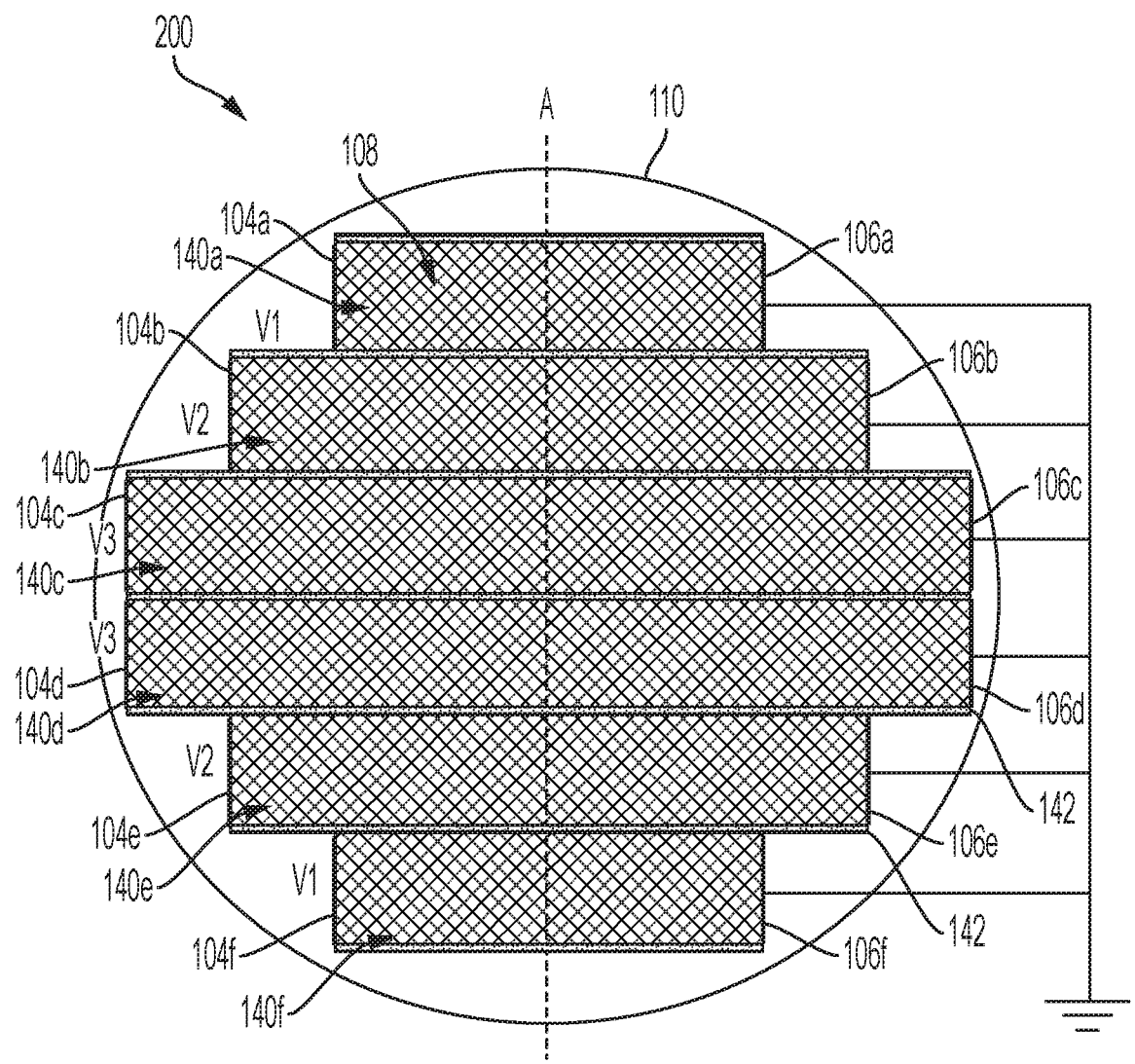
FIG. 5B depicts a cross-section of a heater for heating a catalyst with multiple resistive paths of different lengths, according to an example.
Figure 5C:
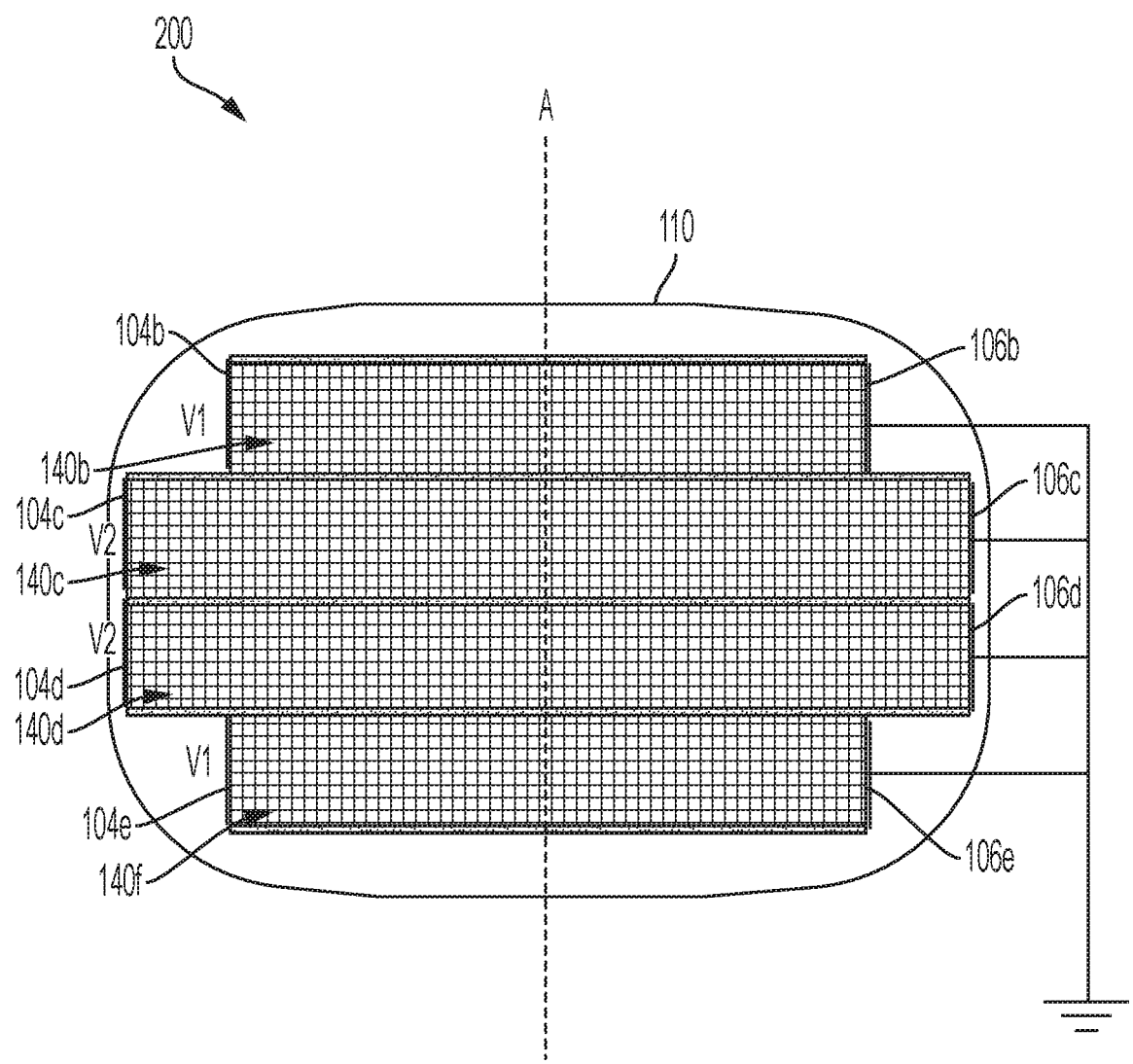
FIG. 5C depicts a cross-section of a heater for heating a catalyst with multiple resistive paths of different lengths, according to an example.

One embodiment for achieving substantially similar current, namely by employing varying potentials to address the variation in total resistance between resistive paths 140, is shown in FIGS. 5A-5C. Turning first to FIG. 5A, there is shown a cross-section of a honeycomb body 102 having resistive paths 140*a*-140*f*. In this example, the heater 200 comprises a plurality of positive electrodes 104*a*-104*f*. Each positive electrode 104*a*-104*f* is, furthermore, associated with at least one respective resistive path 140*a*-140*f*. For example, positive electrode 104*a* is associated with resistive path 140*a*, positive electrode 104*b* is associated with resistive path 140*b*, and so on. The resistive paths 140*a*-140*f* have different lengths between their respective electrodes, i.e., with the resistive path 140*a* and 140*f* generally being shorter than the resistive paths 140*b* and 140*e*, which are in turn shorter than resistive paths 140*c* and 140*d*.

Each positive electrode 104*a*-104*f* carries a voltage (with respect to corresponding negative electrodes 106*a*-106*f*) proportional to the resistance of the resistive path with which the positive electrode 104*a*-104*f* is associated. Thus, positive electrodes 104*c*, 104*d*, each of which are respectively associated with resistive paths 140*c*, 140*d* arranged to span across substantially the entire diameter of the heater 200, carry the largest voltage, labeled as V3. This is because, all other aspects being equal (e.g., consistent cell size, web thickness, number of rows of cells, and material composition used in all of the resistive paths 140*a*-140*f*), the longest resistive paths 140 will exhibit the largest total resistance (as discussed above). Resistive paths 140b, 140e, located to either side of center resistive paths 140c, 140d, are shorter and will correspondingly have a smaller resistance than the resistive paths 140c and 140d, and thus receive proportionally smaller voltage, labeled V2. Likewise, resistive paths 140a, 140f located to either side of resistive paths 140b, 140e will have the smallest resistances, and thus receive the smallest voltage, labelled V1, from electrodes 104a, 104f, respectively.

As shown in FIG. 5A, the positive electrodes 104a-104f and negative electrodes 106a-106f can be embedded into honeycomb structure 108, shaping the resistive paths into rectangles, when viewed in cross-section. The resistive paths 140, being shaped as rectangular blocks of the intersecting walls, will have even resistance across the width of the path, and will thus heat evenly across the width of the resistance path 140a-140f This example, however, reduces the overall size of the heated area of the honeycomb structure, as the material located radially outside of the resistive paths 140 does not receive current. Thus, in an alternative example, the positive electrodes can follow the curved shape of the outer periphery of the honeycomb structure or skin 110 (e.g., as shown in FIGS. 1 and 4, but arranged as multiple separate electrodes instead on a single electrode). In this example, the resistance of each resistive path 140 will vary along its width, as the length of one side will be longer than other than side. This variation can be diminished by minimizing the width of each resistive path 140, and accordingly, the disparity between the lengths of resistive path 140 across its width. To the extent positive electrodes applying different voltages are employed, insulating layers, such as insulating layers 142 (e.g., gaps or non-conductive materials), must be disposed between the positive electrodes 104 to prevent short circuiting.

Variations between other aspects of the intersecting walls 112, such as variations in the web thickness, cell size, or composition of the material of the intersecting walls 112, can change the total resistance of each resistive path 140. To the extent that these changes vary the total resistance, the voltage applied by respective electrode should be proportional. Thus, if the thickness of the intersecting walls is greater for one resistive path, the total resistance of the resistive path 140 will, as a result, be smaller, and thus the total applied voltage will be proportionally smaller.

The potential difference applied to each resistive path can be set according to any method known in the art. In some embodiments, a separate battery or voltage source is supplied for each electrode pair. However, a separate battery or other voltage source need not be employed for each resistive path. Rather, one voltage source can be employed, and, from that voltage source, the proportional potential differences of each positive electrode 104a-104f can be generated. In an example, to create the respective potential difference of each positive electrode 104, an additional resistance can be placed in series with, for example, a single voltage source and each resistive path. The additional resistances can be sized such that the respective sums of the resistances of the resistive path 140a-140f and the additional resistance are substantially equivalent. For example, if the shortest resistive path (e.g., resistive path 140a or 140f) has a resistance denoted as R1 and the central resistive path (e.g., resistive path 140c or 140d) has a resistance denoted as R3, then the sum of R1 and additional resistance should be equivalent to R3. Similarly, the path adjacent the central resistive path has a resistance denoted as R2, the sum of the R2 and the additional resistance in series with adjacent resistive path should also be equivalent to R3.

The honeycomb body 102 can have a circular, ellipsoidal, or other cross-section that results in the distance between electrode pairs varying with respect to the diametric axis A. The cells 114 can be oriented in any direction with respect to diametrical axis A. For example, as shown in FIG. 5B, the intersecting walls 112 can intersect at a 45° angle with respect to the diametrical axis A. In this example, the current will run through the intersecting walls 112 in a zig-zag pattern. By contrast, in the example of FIG. 5A, the current will be more focused in a straight line along the intersecting walls 112 to form the shortest path between the electrodes 104, 106. In FIG. 5A, the intersecting walls 112 parallel to the insulating layers 142 will carry substantially more current than the intersecting walls 112 extending between the insulating layers 142. Thus, because, in the 45° example of FIG. 5B, the current has no direct (straight) path between the electrodes, the effective length of the resistive paths 140 is greater, and, consequently, the resistance is greater.

According to one embodiment for obtaining a uniform heat profile, the resistive paths 140 can be structured to have substantially similar total resistances, and, thus, conduct substantially equivalent current in response to the same voltage being applied across each resistive path by electrodes 104, 106. Stated differently, if the electrodes 104, 106 are arranged with respect to the resistive paths 140 such that the resistive paths are electrically parallel with one another, and the resistance of the resistive paths is substantially equivalent, then the current through each respective resistive path 140 will likewise be substantially equivalent.

Figure 6:
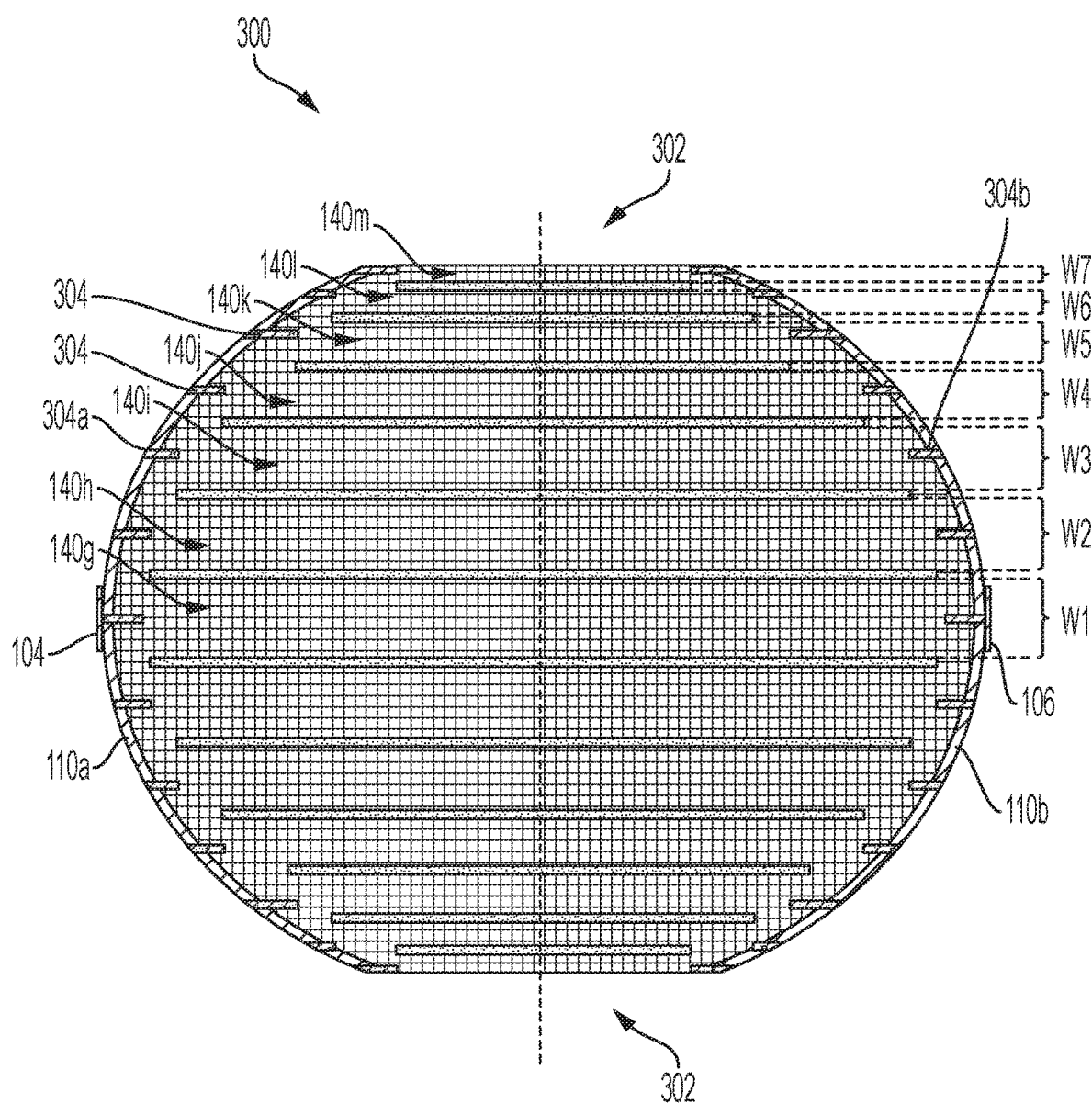
FIG. 6 depicts a cross-section of a heater for heating a catalyst with multiple resistive paths of different lengths and varying widths, according to an example.

In order to ensure that the resistance of each resistive path 140 is substantially equivalent, the width of each resistive path 140 (e.g., number of rows of cells) can be varied in proportion to the length of the resistive path 140, as shown in FIG. 6. Generally, the total resistance of each resistive path 140 will be a function of the resistive path's 140 length and width. As each resistive path 140 lengthens, the total resistance increases because the current must travel a greater distance along a resistive material; whereas, as each resistive path 140 widens, the total resistance decreases, as a greater number of intersecting walls 112 are available to carry current.

Analogizing to a simple wire, the resistance of the wire can be calculated as:

$$R = \rho \frac{L}{A} \qquad \text{Eq. (1)}$$

where R is the resistance, ρ is the material resistivity, L is the length and A is the cross sectional area. Thus, the greater the cross-sectional area of the wire, the lower its total resistance. Likewise, as the width of a resistive path 140 increases, the total resistance of the path diminishes. Stated more formally, the resistance of a given resistive path 140 of a honeycomb structure 108 having at least one set of walls 112 (e.g., first set of walls 118) that extend directly between the electrodes 104, 106, can be given as:

$$R = \frac{\rho}{WT * \sqrt{CPSI} * W_{RP}} * \frac{N1}{N2+1} \qquad \text{Eq. (2)}$$

where R is, again, the resistance of the given resistive path 140, ρ is the material resistivity (e.g., the resistivity of the material from which the honeycomb structure is formed), WT is the Web Thickness (mil), CPSI is the number of cells per square inch of the honeycomb structure cross section, $W_{RP}$ is width of the resistive path 140, N1 is the total number of cells extending along diametrical axis A (as defined above) and N2 is the total number of cells extending transverse to diametrical axis A. Equation (2) takes into account the notion that the resistance of any resistive path 140 is dependent on the number of cells that define its length and width. A set number of cells 114 are located in series between the positive electrode 104 and negative electrode 106 for any given resistive path 140. Thus, by varying the number of cells 114 along the diametrical axis, that is, by varying the width of the resistive path 140, the total resistances of the resistive paths 140 can be set to be substantially equivalent. Accordingly, if each resistive path 140 features a substantially equivalent total resistance, a substantially equivalent current will flow through each resistive path in response to the same potential.

Thus, as shown in FIG. 6, resistive path 140*g*, extending across the center of the cross-section of honeycomb body 102, will have width W1. The adjacent resistive path 140*h*, being shorter, is also narrower, having a width W2 that is less than the width of W1. The shortest resistive path 140*m* thus has the shortest width W7. Accordingly, as the length of resistive paths progressively shortens across diametrical axis A, the widths of resistive paths 140*g*-140*m* is correspondingly narrowed, such that the following expression is true: W7<W6<W5< . . . W1.

While heater 300 in FIG. 6 is illustrated with walls extending directly between the positive electrode 104 and negative electrode 106 (i.e., the walls are aligned to provide a straight path between the electrodes 104, 106), the walls could be arranged at angles, e.g., as shown in and discussed with respect to FIG. 4 The resistance of a given resistive path 140 will be inversely proportional to its cross-sectional width, regardless of the relative orientation of the intersecting walls 112 or the geometry of each cell 114. Furthermore, while insulating layers 142 are shown in FIG. 6 to only extend across a portion of the cross-section of the honeycomb structure 108, it should be understood that, in alternative examples, insulating layers 142 can extend across the entire cross-sectional length of honeycomb structure 108 (e.g., as shown in FIGS. 1 and 4).

Additionally, as shown in FIG. 6, outer skin 110 can be used as a conductive path to apply a substantially similar potential across each resistive path 140. For example, the outer skin 110 can be comprised from, and/or effectively form a part of the electrodes 104, 106. In general, if outer skin 110 is thicker than the individual cell webs 120, 122, and/or made from a more conductive material, it will provide a lower-resistance path for conducting current. Thus, by placing positive electrode 104 in communication with a first portion 110*a* of the outer skin 110, it will become positively charged; similarly, by placing negative electrode 106 in communication with second portion 110*b* of the outer skin 110, the second portion 110*b* will become grounded. To avoid creating a short circuit, whereby current flows directly from the positive electrode to the negative electrode, an electrical discontinuity 302 can be implemented into outer skin (e.g., a portion of the outer skin 110 and/or some of the cells can be removed), in order to electrically insulate the first portion 110*a* of the outer skin 110 from the second portion 110*b* (but for the resistive connection afforded by the honeycomb structure 108). In alternative example, the electrical discontinuity 302 can be implemented by placing an insulating material between the first portion 110*a* and the second portion 110*b*. Alternatively, e.g., as shown in FIG. 1, the heater 300 can include a continuous skin with curved electrodes engaged therewith on opposite sides of the heater.

In order to evenly apply the potential difference existing at the fi electrodes 104, 106 to each resistive path 140, conductors 304 can be included that extend into the honeycomb structure. For example, conductor 304*a* is in electrical communication with the electrode 104 (e.g., via first portion 110*a* of skin 110) and promotes current flow into the resistive path 140*i*, while conductor 304*b* is in electrical communication with electrode 106 (e.g., via the second portion 110*b* of skin 110) to promote current flow from the opposing end of resistive path 140*i*, thus generating a potential difference across resistive path 140. In this way, a substantially similar potential difference can be created across each resistive path 140. The conductors 304 can be formed by filling selected ones of the cells with a conductive material, thereby promoting current flow into each of the resistive paths 140 between the electrodes 104, 106. As another example, conductors 304 can be formed by embedding conductive elements into the honeycomb structure of the heater 300. In one embodiment, the conductors 304 are formed as prongs of the electrodes that are inserted into the honeycomb structure (e.g., which puncture through the outer skin of the honeycomb body).

Figure 7A:
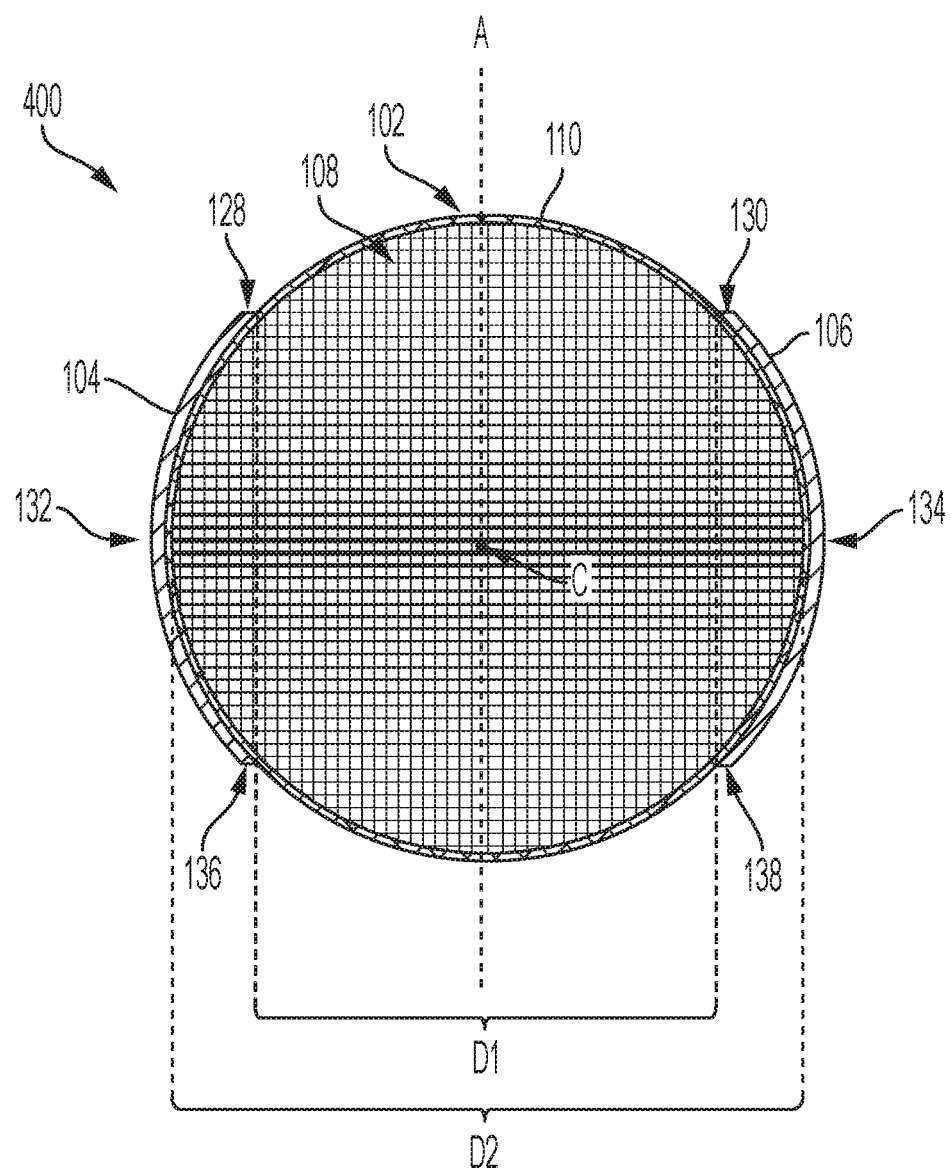
FIG. 7A depicts of a cross-section of a heater for heating a catalyst with intersecting walls of varying thickness, according to an example.

In some embodiments, the resistance of a given current or resistive path is adjusted by varying the thickness of the intersecting walls 112 in proportion to the resistance of the current path. Thus, in the example of FIG. 7A, rather than forming individual resistive paths using insulating layers, the intersecting walls 112 that extend between the electrodes, and thus carry current, vary in thickness in proportion to their length. In this example, the longest intersecting walls 112 (i.e., those that extend through, or are adjacent to, the center C of cross-section of the honeycomb body 102) are arranged so that they are the thickest. Thicker walls 112 offer greater conductivity, and thus by increasing the thickness of the walls 112 that have the longest length between the electrodes 104, 106 (i.e., those extending through or adjacent to the center axis C in FIG. 7A), the resistivity of these walls is reduced. In this way, by incrementally decreasing the thickness of the walls 112 in proportion to their length, the resistance of the current path formed through each of the walls 112 is made equal.

Thus, as shown in FIG. 7, the thickest intersecting walls 112 extending between electrodes 104, 106, are located at or adjacent to the central axis C, with the walls 112 become progressively thinner as they are spaced from central axis C along diametrical axis A. Thus, the intersecting walls 112 extending across distance D1 between the first end 128 of positive electrode 104 and negative electrode 106 are the thinnest, while the intersecting walls 112 extending across distance D2 between the center 132 of positive electrode 104 and the center 134 of negative electrode 106 are the thickest. In this way, the current across each intersecting wall 112, between electrodes 104 and 106, can be substantially equivalent, and a uniform heating profile can be achieved.

Figure 7B:
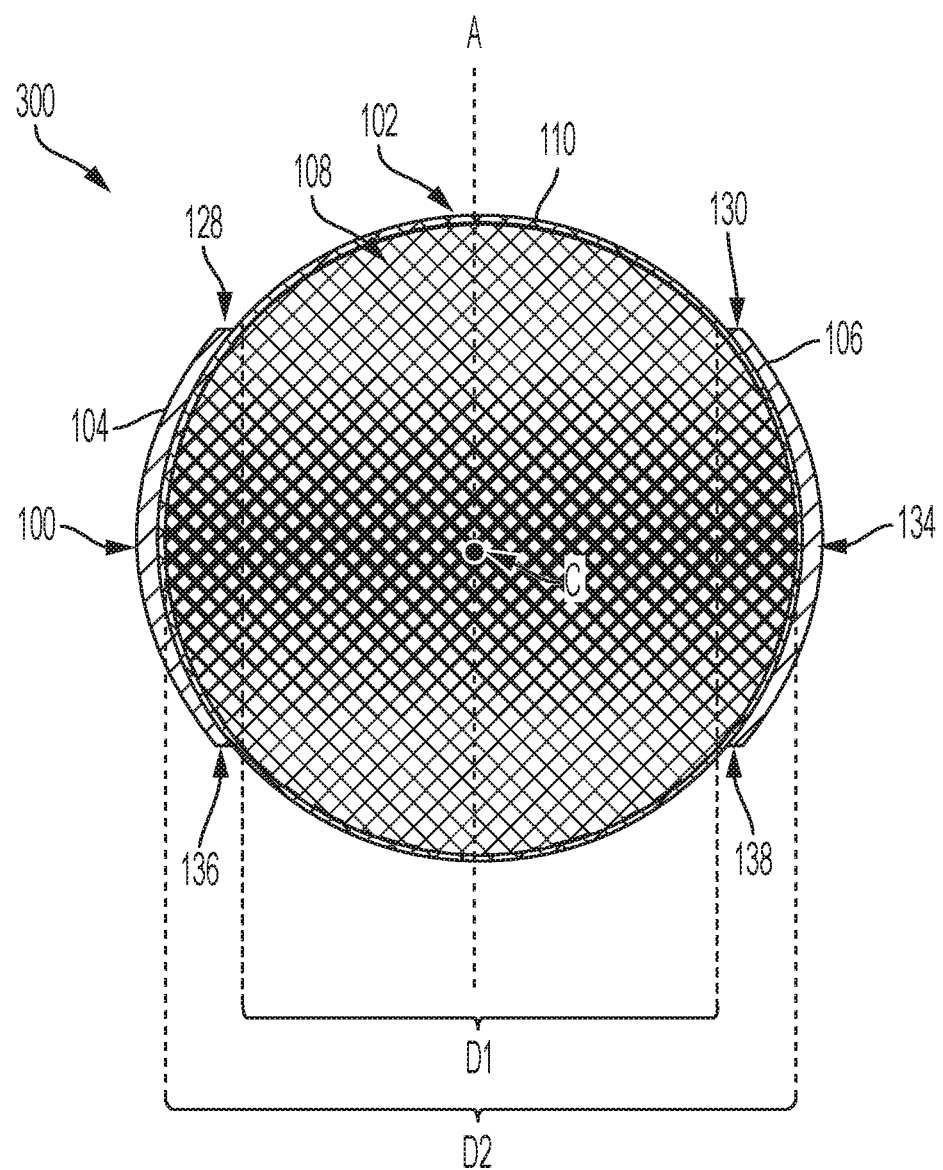
FIG. 7B depicts of a cross-section of a heater for heating a catalyst with intersecting walls of varying thickness, according to an example.

The current path formed by the intersecting walls need not necessarily form a direct path as shown in FIG. 7B. Again, as described above particularly with respect to FIG. 4, the intersecting walls 112 can, for example, be at a 45° angle (or any other oblique angle) with respect to diametrical axis A. Accordingly, the thickness of webs 120, 122 defining cells 114 extending between the electrodes 104, 106, transverse to diametrical axis A, can be made proportional to the length of the current path of which webs 120, 122 are part. The current paths may be defined as a set of paths defining the shortest distances current travels through the webs 120, 122 between the electrodes 104, 106. Stated differently, a thickness of a respective web 120, 122 is varied in proportion to of the length of the current path from the positive electrode to the negative electrode through the respective web 120, 122. Similar to FIG. 7A, the walls 112 at or proximate to the center axis C are thickest, with the walls progressively thinning at distances along the diametrical axis A that are spaced further from the center axis C.

The general description of heater 100, including the honeycomb body 102 and the electrodes 104, 106 are generally applicable to heaters 200, 300, and 400 described in connection with FIGS. 5-7B, as heaters 200, 300, and 400 are variations of heater 100. Similarly, any aspect, feature, and/or component discussed with respect to one or more embodiments herein (e.g., the heater 100, 200, 300, and/or 400) can be combined, mutatis mutandis, with other aspects, features, and/or components of the other embodiments.

In each of the above examples, by varying the voltage applied to a resistive path, the width of a resistive path, or the thickness of the cell webs, a substantially uniform current is maintained across a cross-section of the honeycomb body (e.g., the current between current paths is substantially equivalent) between the electrodes, and, thus, a uniform heating profile is maintained between the electrodes.

While several inventive examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive examples described herein. It is, therefore, to be understood that the foregoing examples are presented by way of example only and that, within the scope of the appended claims and equivalents thereto, inventive examples may be practiced otherwise than as specifically described and claimed. Inventive examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. An electrical heater, comprising:
    a honeycomb body comprising a plurality of intersecting walls that form a plurality of channels extending along a longitudinal axis, the intersecting walls comprising a conductive material;
    a plurality of electrically resistive paths, each resistive path of the plurality of resistive paths comprising at least a portion of the plurality of intersecting walls and extending a length across the honeycomb body transverse to the longitudinal axis; and
    at least one positive electrode and at least one negative electrode in electrical communication with each other via the plurality of resistive paths, the at least one positive electrode and the at least one negative electrode being operatively positioned to generate a respective flow of current through each resistive path;
    wherein the lengths of at least two of the resistive paths differ from each other; and
    wherein the resistive paths are configured with respect to the at least one positive electrode and the at least one negative electrode such that the current in each of the resistive paths is substantially equal.

2. The electrical heater of claim 1, wherein the positive electrode and negative electrode are arranged such that the plurality of resistive paths are mutually electrically parallel, the total resistance of each path being substantially equal.

3. The electrical heater of claim 1, wherein a width of each resistive path of the plurality of resistive paths is proportional to its length, such that a resistance of each resistive path of the plurality of resistive paths is substantially equal.

4. The electrical heater of claim 1, wherein one or more of the insulating layers do not extend entirely across the honeycomb body.

5. The electrical heater of claim 4, further comprising a plurality of conductors associated with the plurality of resistive paths, wherein at least one of the conductors is embedded in the honeycomb structure to promote current flow between each of the resistive paths and the positive electrode, the negative electrode, or both.

6. The electrical heater of claim 5, wherein the conductors comprise one or more of the channels of the honeycomb body filled with conductive material.

7. The electrical heater of claim 1, wherein the positive electrode and the negative electrode apply a respective voltage to each resistive path of the plurality of resistive paths, wherein a magnitude of the respective voltage is proportional to a total resistance of the resistive path to which the respective voltage is applied.

8. The electrical heater of claim 7, wherein the positive electrode comprises a plurality of positive electrodes, each positive electrode of the plurality of positive electrodes being associated with at least one resistive path of the plurality of resistive paths and being configured to apply the respective voltage to the associated resistive path.

9. The electrical heater of claim 1, wherein each insulating layer is formed by a slot in the honeycomb body.

10. The electrical heater of claim 1, wherein the plurality of insulating layers are mutually parallel, each insulating layer extending in a respective plane parallel to central axis of the electrical heater.

11. A system for treating exhaust, comprising the electrical heater of claim 1 and an exhaust treatment device, wherein the honeycomb body of the electrical heater is a first honeycomb body and the exhaust treatment device comprises a second honeycomb body, and wherein the electrical heater is positioned upstream of the exhaust treatment device.

12. The system of claim 11, wherein the first honeycomb body of the electrical heater has a wall thickness that is different than that of the second honeycomb body of the exhaust treatment device.

13. The system of claim 11, wherein the first honeycomb body of the electric heater has a cells per square inch that is different than that of the second honeycomb body of the exhaust treatment device.

14. The electrical heater of claim 1, wherein the honeycomb body comprises a plurality of separate blocks or segments of honeycomb structure, wherein each of the resistive paths is formed by one of the separate blocks or segments of honeycomb structure and the separate blocks or segments of honeycomb structure are separated from each other by the plurality of insulating layers.

15. A method for heating a catalyst with a heater comprising a honeycomb body comprising a plurality of intersecting walls and a longitudinal axis, the method comprising:

applying a potential difference across an electrode pair comprising a positive electrode and a negative electrode to generate a respective flow of current through each resistive path of a plurality of resistive paths formed between the electrode pair across a cross-section of the honeycomb body of the heater;

wherein the resistive paths of the plurality of resistive paths are separated from each other by one or more insulating layers;

wherein lengths of at least two of the resistive paths of the plurality of resistive paths are different; and wherein the resistive paths are configured with respect to the electrode pair such that the current in each of the resistive paths is substantially similar.

16. The method of claim 15, wherein the positive electrode and negative electrode are arranged such that the plurality of resistive paths are mutually electrically parallel, the total resistance of each path being substantially similar.

17. The method of claim 16, wherein a width of each resistive path of the plurality of resistive paths is proportional to its length, such that a resistance of each resistive path of the plurality of resistive paths is substantially similar.

18. The method of claim 17, wherein the honeycomb body further comprises an outer skin disposed about at least a portion of the honeycomb body, wherein at least a portion of the outer skin carries an electric charge received from the positive electrode, wherein the honeycomb body defines a first plurality of slots, each slot of the first plurality of slots being in electrical communication with a respective resistive path of the plurality of resistive paths and being in further electrical communication with the at least a portion of the outer skin, such that the electric charge is communicated to the respective resistive path of the plurality of resistive paths.

19. The method of claim 15, wherein the step of applying a potential difference comprises applying a respective potential difference to each resistive path of the plurality of resistive paths, wherein a magnitude of the respective potential difference is proportional to a total resistance of the resistive path to which the respective potential difference is applied.

20. The method of claim 19, wherein the positive electrode comprises a plurality of positive electrodes, each positive electrode of the plurality of positive electrodes being associated with at least one resistive path of the plurality of resistive paths and being configured to apply the respective potential difference to the associated resistive path.

* * * * *

UNITED STATES PATENT AND TRADEMARK OFFICE
CERTIFICATE OF CORRECTION

| | |
|---|---|
| PATENT NO. | : 11,215,096 B2 |
| APPLICATION NO. | : 16/998615 |
| DATED | : January 4, 2022 |
| INVENTOR(S) | : Thomas Adam Collins et al. |

It is certified that error appears in the above-identified patent and that said Letters Patent is hereby corrected as shown below:

In the Specification

In Column 1, Line 12, delete "entirety" and insert -- entirety. --.

In the Claims

In Column 14, Line 63, in Claim 13, delete "electric" and insert -- electrical --.

Signed and Sealed this
First Day of August, 2023

Katherine Kelly Vidal
*Director of the United States Patent and Trademark Office*